United States Patent [19]

Barfield

[11] 4,183,176
[45] Jan. 15, 1980

[54] SYSTEM FOR SUPPLYING LIQUIDS TO POTTED PLANTS

[76] Inventor: William G. Barfield, 137 Tropical La., Corpus Christi, Tex. 78408

[21] Appl. No.: 923,809

[22] Filed: Jul. 12, 1978

Related U.S. Application Data

[63] Continuation of Ser. No. 786,108, Apr. 11, 1977, abandoned.

[51] Int. Cl.² .................. A01G 27/00; F16K 31/18
[52] U.S. Cl. ................................ 47/79; 137/398; 137/412; 137/416; 251/75; 251/15; 73/317; 119/80
[58] Field of Search .................... 47/79–82, 47/62–63, 48.5, 17, 1.4; 119/78–80; 137/400, 409, 411–413, 416, 434, 442, 443, 398; 73/317, 319, 322.5, 308; 251/75, 15, 58

[56] References Cited

U.S. PATENT DOCUMENTS

| | | | |
|---|---|---|---|
| 124,207 | 3/1872 | Hess | 47/79 |
| 603,492 | 5/1898 | Waterer | 47/66 |
| 1,475,403 | 11/1923 | Mitchell | 119/80 |
| 2,818,877 | 1/1958 | Swanson | 137/442 X |
| 2,835,270 | 5/1958 | York et al. | 137/412 |
| 2,851,055 | 9/1958 | Mosher | 137/411 X |
| 2,951,556 | 1/1960 | Nilsen | 119/80 X |
| 3,053,011 | 9/1962 | Silverman | 47/79 |
| 3,632,925 | 1/1972 | Fujiwara | 73/319 X |
| 3,686,792 | 8/1972 | Barfield | 47/79 X |
| 4,081,638 | 3/1978 | Thorn et al. | 73/322.5 |

FOREIGN PATENT DOCUMENTS

| | | | |
|---|---|---|---|
| 29425 | 8/1907 | Austria | 47/80 |
| 5548 | of 1912 | United Kingdom | 47/66 |
| 477706 | 9/1972 | U.S.S.R. | 47/65 |

*Primary Examiner*—E. H. Eickholt
*Attorney, Agent, or Firm*—Marvin B. Eickenroht; Jennings B. Thompson

[57] ABSTRACT

There is disclosed a system for supplying liquids to potted plants through feeder conduits fluidly connecting with the lower ends of the plants and leading from a main distribution conduit to which the liquid is admitted from a water main or other pressurized source.

4 Claims, 3 Drawing Figures

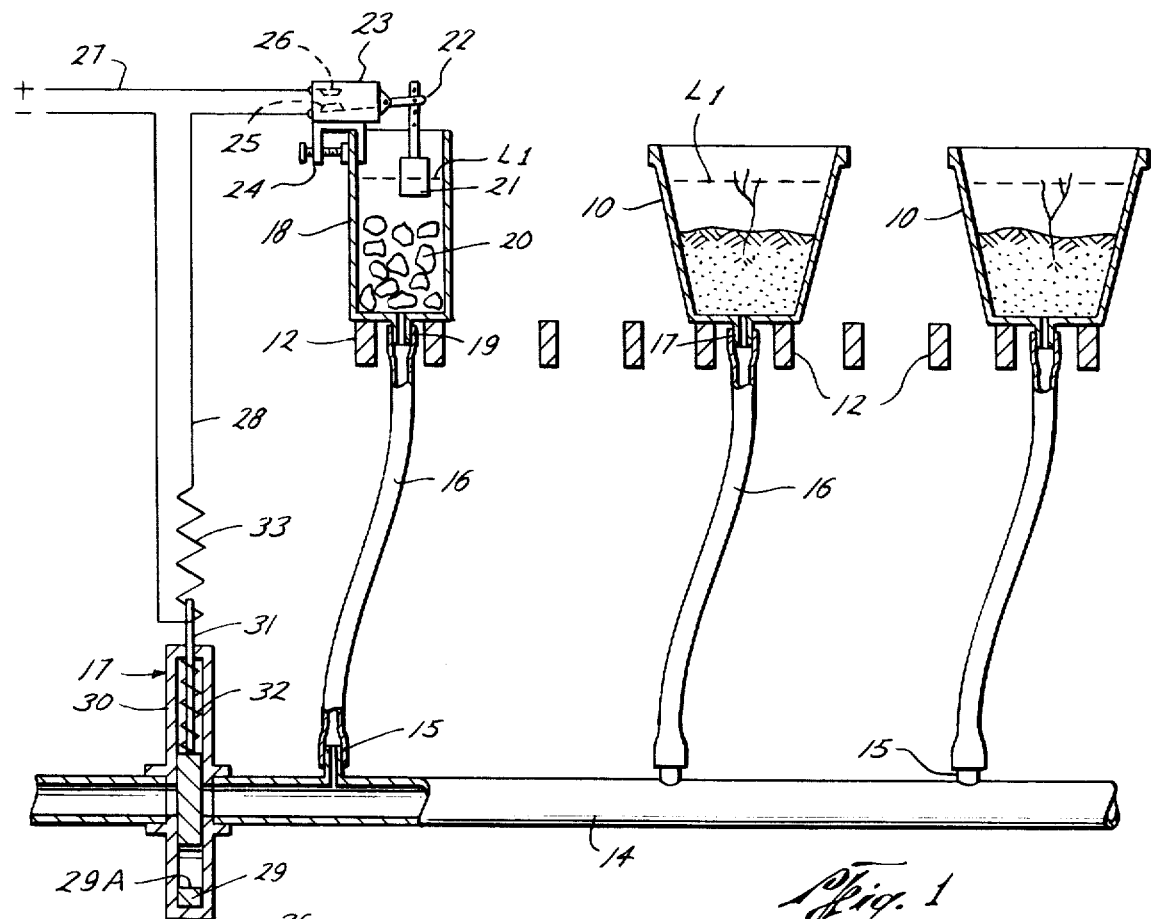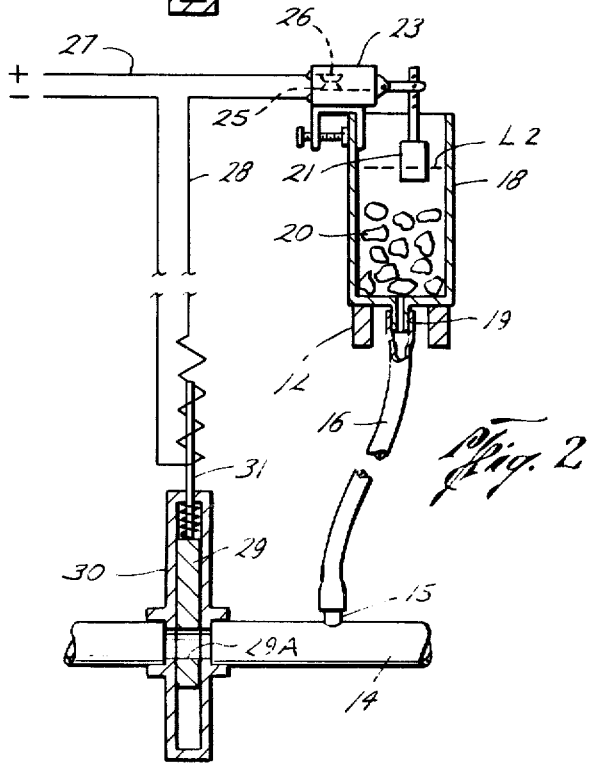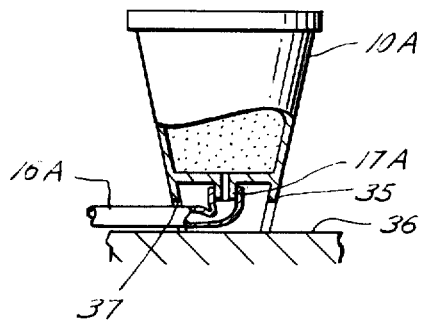

SYSTEM FOR SUPPLYING LIQUIDS TO POTTED PLANTS

This is a continuation of application Ser. No. 786,108, filed Apr. 11, 1977, by William G. Barfield and now abandoned.

This invention relates to a system for supplying liquids such as water and/or fertilizer to potted plants within a greenhouse or other area where large numbers of them are usually grouped in rows and in relatively close proximity to one another. More particularly, it relates to improvements in a system of the type disclosed in my U.S. Pat. No. 3,686,792, wherein such liquid is supplied to the pots through a main distribution conduit extending beneath a support surface for the pots and feeder conduits which extend from the main conduit for releasable fluid connection with a hole in the lower end of each of the pots.

In the system of my prior patent, the main conduit is connected to an open tank located near the support surface and adapted to receive liquid from a pressurized source of same, such as a water main. The supply of liquid to the tank is controlled by a float valve so as to maintain a desired liquid level in the tank, and thus within each of the pots. Although this system represented a substantial improvement over the prior art, the pot filling process was nevertheless time consuming due to the relatively small hydraulic head available to cause the liquid to rise in the pots. This, of course, stems from the fact that the large head normally available in the water main or other pressurized source of liquid is lost as the liquid is introduced into the tank, so that the only head available to fill the pots was that due to the difference between the liquid level in the tank and the pots.

Also, although one embodiment of the system of my earlier patent permits the feeder conduits to be connected to the holes conventionally formed in the lower ends of the pots, it requires that the end of each feeder pot be provided with a special connector for fitting into the hole in the pot. Furthermore, this requires that the pots be mounted on a support surface comprising spaced slats or having other openings through which the feeder conduits may be extended.

An object of the present invention is to provide a system of this type in which the pots may be filled in much less time and, more particularly, wherein the hydraulic head available for filling the pots is the full head of the pressurized source of the liquid.

Another object is to provide such a system which does not require a special tank, and which is otherwise of simple and inexpensive construction.

A further object is to provide such a system having pots of such construction as to eliminate the need for providing the end of each feeder conduit with a special connector, and, more particularly, which eliminates the necessity for supporting the pots on a particular type of support surface.

These and other objects are accomplished, in accordance with the illustrated embodiments of the present invention, by apparatus which includes, as in the apparatus of my prior patent, a main distribution conduit and a plurality of feeder conduits each extending from the main conduit for releasable connection with the hole in the lower end of a pot. However, as compared with the prior apparatus, the main distribution conduit is directly connectible to a water main or other source of liquid under pressure, so that the full hydraulic head of the liquid is available to cause liquid to rise in the pots. More particularly, my improved apparatus includes a control pot which also has a hole in its lower end and which is adapted to be supported near or on generally the same level as the other pots, and a valve means in the main conduit intermediate the liquid source and the feeder conduits which is automatically moved to an open position to permit the liquid to flow into the pots, when the liquid in the control pot drops below a predetermined level, and automatically closes the valve means when the liquid in the control pot rises to the predetermined level, the unoccupied volume within the control pot intermediate its lower end and such predetermined level being no greater than that of any of the other pots so that the control pot fills with liquid at least as quickly as the others.

Inasmuch as the control pot fills faster than the plant pots, liquid may not have reached the predetermined level in the plant pots upon closing of the valve means. However, since the level of liquid in the control pot is higher than that in the plant pots, it will drain out of the control pot and into the plant pots. When the liquid level in the control pot drops, the valve means will reopen to admit additional liquid from the water main or other source so as to again raise the liquid in the control pot to the predetermined level. Upon reclosing of the valve means, the "U" tube effect will again occur to further raise the level of liquid within the plant pots, this cycle continuing until such time that the liquid in all of the plant pots is at the predetermined level.

In the preferred and illustrated embodiment of the invention, the valve means is yieldably urged to one of its positions, and a means for sensing the level of liquid in the control pot is connected to the valve means to move it to its other position when the liquid in the control pot reaches the predetermined level. More particularly, the valve means is yieldably urged to closed position, and the sensing means is connected to the valve means by means which includes a solenoid which, when energized, moves the valve means to open position, and an electrical circuit which includes a switch in series with the solenoid, the switch being connected to the sensing means as to energize the solenoid in order to open the valve means, when the liquid falls below the predetermined level, and to deenergize the solenoid to permit the valve means to move to closed position when said liquid rises to said predetermined level. As illustrated, the sensing means comprises a float which is mounted on the control pot for disposal therein and which is connected to the switch by an arm which moves the switch between circuit opening and closing positions in response to the rise and fall of the float.

In accordance with a further aspect of the present invention, each pot has a lower nipple which extends downwardly from its lower end so that liquid may be supplied to a plant within the pot through a feeder conduit fitted over the lower end of the nipple, thereby avoiding the necessity of a special connector for fitting within a hole in the pot. In an alternative form of the present invention, the pot also includes a skirt adapted to rest on a support surface in order to raise the lower end of the nipple thereabove, the skirt having at least one opening in the side thereof through which a feeder conduit may be passed for fitting over the lower end of the nipple, whereby the pot need not be supported on a surface having spaced slats or other access openings for the feeder conduit.

In the drawings, wherein like reference characters are used throughout to designate like parts:

FIG. 1 is a side view, partly in section, of a system embodying my invention, with the liquid in the plant and control pots being shown at its predetermined level and the valve means in closed position;

FIG. 2 is another side view of a portion of the system, with the liquid in the control pot being shown at a level beneath its predetermined level and the valve means in open position to admit water from a main for filling the pots; and FIG. 3 is a side view, partly in section, of the alternative form of pot.

With reference now to the details of the above-described drawings, the overall system best shown in FIG. 1 includes at least one row of pots 10 supported on a table having spaced slats 12 or other support. As shown, all of the pots 10, which may include additional rows extending transversely of the plane of FIG. 2 are supported on substantially the same level. Of course, the pots may be suspended or otherwise supported on substantially the same level. With the pots 10 of essentially the same size, and with the plants within each also being on substantially the same level, each is adapted to be filled with liquid to substantially the same level.

The liquid, which may be water or fertilizer, or a combination of the two, is supplied to the pots 10 through a main distribution conduit 14 extending beneath the pots, and, more particularly, beneath slats 12. The liquid is in turn fed to the pots by flexible feeder conduits 16, each of which has a lower end fitted over one of a plurality of upstanding nipples 15 spaced along the length of the main conduit, and an upper end connected to the lower end of a pot. More particularly, and as shown in FIG. 1, each pot is of novel construction in that it includes a hollow nipple 17 extending downwardly from its lower end, whereby the upper end of each feeder conduit may be merely slipped over the nipple for connecting it with the lower end of the pot. As shown, the slats are taller than the nipples, and the pots are arranged with the nipple of each over a slat.

The right-hand end of the main distribution conduit 14 is closed in any suitable manner, and the left-hand end thereof is connected to a water main (not shown) or any other suitable source of pressurized liquid. Flow of the liquid from the main is controlled by valve means 17, which may be moved between the closed position of FIG. 1 and the open position of FIG. 2. In the latter position, the valve means permits the liquid under a full head of pressure to flow upwardly through the feeder conduits 16 into the pots 10.

The apparatus also includes a control pot 18 having a lower end which is also supported on slats 12 and thus on substantially the same level as the plant pots 10. Control pot 18 has a hollow nipple 19 in its lower end to which the upper end of a feeder conduit 16 may be connected in the same manner that feeder conduits 16 are connected to pots 10. The lower end of the feeder conduit 16 leading from control pot 18 is connected to a nipple 15 of the main distribution conduit 14, again in the same manner as are the other feeder conduits 16 leading from plant pots 10.

The open area in the control pot 18 is of such size that it will fill with liquid quicker than any of the pots 10. This may be accomplished by a control pot 18 having an unoccupied volume therein which is less than that of any of the pots 10, or by filling the interior of the control pot with rocks 20 or the like, or by the combination of its size and filler material.

Although the control pot 18 may be of different cross-sectional area than the plant pots 10, it is of substantially the same height, so that it may be filled with liquid to the same level as the desired liquid level in pots 10. This liquid level in control pot 18 is sensed by means of a float 21 which has a rod on its upper end which is pinned to the outer end of an arm 22 pivotally mounted on a switch box 23. The switch box is in turn mounted on a side of the control pot by means of a releasable bracket 24, which is adjustable in height so as to vary the height of the float in the control pot. Height of the float is also adjustable by means of vertically spaced holes in the float rod for receiving the pivot pin connecting it to arm 22.

The inner end of arm 22 extends into box 23 so as to open and close the switch shown in broken lines in response to the rise and fall of the float. Thus, as will be understood from FIGS. 1 and 2, when the liquid rises within the control pot to the desired level L shown in FIG. 1, float 21 is raised so as to lower the inner end of arm 22 within switch box 23. On the other hand, when the liquid drops to the level $L_2$, as shown in FIG. 2, the float is lowered so as to swing the inner end of the arm within the switch box in an upward direction.

A movable contact 25 mounted on the inner end of arm 22 is moved away from a fixed contact 26 in the box so as to open the switch when the liquid is at the desired level $L_1$, as shown in FIG. 1, and is raised into engagement with the fixed contact to close the switch when the liquid has fallen to the level $L_2$ shown in FIG. 2.

The movable and fixed conduits 25 and 26 connected to lines 28 and 27 of an electrical circuit are adapted for connection with a source of electrical energy. When the liquid is at the desired level $L_1$, the circuit is opened, and when it falls to the level $L_2$, the circuit is closed. Although the switch shown and described has been found particularly well suited for this purpose, it obviously may be replaced by other suitable types of switches.

Valve means 17 includes a gate 29 vertically reciprocable within a housing 30 connected in the main distribution conduit 14. The gate has a port 29A therethrough which is aligned with the main distribution conduit when the gate is raised to the position of FIG. 2, and moved out of alignment therewith when the gate is lowered to the position of FIG. 1. The gate is normally urged to its lower, closed position by means of a coil spring 32 mounted within the housing between its upper end and the upper end of gate 29.

A stem 31 extends upwardly from the gate and through coil spring 32 for extension outwardly of the upper end of housing 30. A solenoid 33 surrounds the stem 31 of the gate and is connected in the lead line 28 of the electrical circuit and thus in series with the switch. Thus, when the switch is closed to close the circuit, in response to a drop in liquid level in the control pot, the solenoid 33 is energized so as to raise stem 31 and thus move the gate 29 upwardly to open position. On the other hand, when the switch is opened, upon a rise of the liquid to the desired level $L_1$, the electrical circuit is opened to deenergize the solenoid 33, which permits spring 32 to move the gate to its closed position.

Summarizing operation of the apparatus, with the liquid in control pot 18 at the predetermined level $L_1$, float 21 is raised to open the switch and thus the electrical circuit, so that the gate 29 is urged downwardly to closed position, thereby shutting off the supply of pressurized fluid to feeder conduits 16. Since the open area in the control pot, intermediate its lower end and the desired liquid level, is less than that of any of the pots 10, it will fill with liquid faster than any of the pots 10. As a result, it will cause the switch to open and thus deenergize the solenoid to permit the valve means to be closed, without filling any of the pots with liquid to the liquid level $L_1$. However, as the liquid in the control pot drops to the level $L_2$, because of its flow from the control pots into the other pots 10 in which the liquid level is lower, the switch is closed so as to energize solenoid 33 which lifts the gate against the force of spring 32 to the open position of FIG. 2, whereby pressurized liquid is admitted for flow upwardly through feeder conduit 16 into the pots. As previously described, this cycle continues until all pots 10 are filled to level $L_1$.

The alternative form of pot 10A shown in FIG. 3 differs from each of the pots 10 in that it has a skirt 35 about its lower end which surrounds a hollow nipple 17A which depends therefrom and raises the lower end of such nipple above a support 36. More particularly, the skirt is provided with several slots 37 in its lower end so that a feeder conduit 16A may be extended laterally therethrough to permit its inner end to be slipped over the nipple 17A. As a consequence, the support surface in and around the lower end of pot 10A may be solid—i.e., not slatted or otherwise provided with openings.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A system for wetting plants, comprising pots for the plants each having a hole in its lower end, a control pot also having a hole in its lower end, means for supporting the pots on generally the same level, means for sensing the level of liquid within the control pot, a main distribution conduit connected to a source of liquid which remains under relatively constant pressure upon use in the system, a plurality of feeder conduits each extending from the main conduit for releasable fluid connection with the hole in an individual pot, valve means in the main conduit intermediate said liquid source and said feeder conduits, means for automatically moving the valve means to and maintaining it in fully open position to permit said liquid to flow into said pots, when the liquid in said control pot drops below a predetermined level, and for automatically moving said valve means from fully open to fully closed position when the liquid in said control pot rises to said predetermined level, the unoccupied volume within said control pot intermediate its lower end and said predetermined level being no greater than that of any of the other pots, and the fluid flow from the main conduit into each pot being restricted, so that the control pot fills with liquid at least as quickly as said others.

2. A system of the character defined in claim 1, wherein the means for moving the valve means includes means yieldably urging the valve means to one of its positions, means for sensing the level of liquid in said control pot, and means connecting said sensing means to said valve means to move said valve means to its other position when the liquid in said control pot reaches said predetermined level.

3. A system of the character defined in claim 2, wherein said valve means is yieldably urged to its closed position, and said connecting means includes a solenoid which, when energized, moves the valve means to fully open position, and an electrical circuit including a switch in series with the solenoid and so connected to the sensing means as to energize the solenoid in order to fully open the valve means, when said liquid falls below said predetermined level, and to deenergize the solenoid to permit the valve means to be moved from fully open to fully closed position, when said liquid rises to said predetermined level.

4. A system of the character defined in claim 3, wherein said sensing means comprises a float mounted on said control pot for disposal therein and connected to said switch by an arm which moves said switch between circuit opening and closing positions.

* * * * *